(12) United States Patent
Xu et al.

(10) Patent No.: US 9,985,926 B2
(45) Date of Patent: May 29, 2018

(54) ADDRESS ACQUIRING METHOD AND NETWORK VIRTUALIZATION EDGE DEVICE

(71) Applicant: Huawei Technologies Co., Ltd., Shenzhen (CN)

(72) Inventors: Xiangyang Xu, Shenzhen (CN); Liufei Wen, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 83 days.

(21) Appl. No.: 15/213,911

(22) Filed: Jul. 19, 2016

(65) Prior Publication Data

US 2016/0330166 A1    Nov. 10, 2016

Related U.S. Application Data

(63) Continuation of application No. PCT/CN2014/070931, filed on Jan. 20, 2014.

(51) Int. Cl.
*H04L 29/12* (2006.01)
*H04L 12/46* (2006.01)
(Continued)

(52) U.S. Cl.
CPC ........ *H04L 61/103* (2013.01); *H04L 12/4633* (2013.01); *H04L 45/586* (2013.01); *H04L 45/7453* (2013.01); *H04L 61/6022* (2013.01)

(58) Field of Classification Search
None
See application file for complete search history.

(56) References Cited

U.S. PATENT DOCUMENTS

2011/0010769 A1\*  1/2011  Jarredal ............. H04L 63/0236
                                                                726/13
2012/0099602 A1   4/2012  Nagapudi et al.
(Continued)

FOREIGN PATENT DOCUMENTS

CN        101924707 A     12/2010
CN        102377578 A      3/2012
(Continued)

OTHER PUBLICATIONS

Nakagawa, Y., et al., "A Management Method of IP Multicast in Overlay Networks using OpenFlow," HotSDN, Aug. 13, 2012, pp. 91-96.
(Continued)

*Primary Examiner* — Saba Tsegaye
(74) *Attorney, Agent, or Firm* — Conley Rose, P.C.

(57) ABSTRACT

An address acquiring method includes receiving an address resolution request packet sent by a source host, where the address resolution request packet includes an Internet Protocol (IP) address of a destination host; determining another network virtualization edge (NVE) device, where the another NVE device stores a correspondence between the IP address of the destination host and a Media Access Control (MAC) address of the destination host and a correspondence between the IP address of the destination host and an IP address of a destination NVE device corresponding to the destination host; obtaining the MAC address of the destination host and the IP address of the destination NVE device corresponding to the destination host from the another NVE device according to the IP address of the destination host. The technical solutions provided in the present disclosure are intended to reduce processing pressure on a physical network.

18 Claims, 10 Drawing Sheets

(51) Int. Cl.
*H04L 12/713* (2013.01)
*H04L 12/743* (2013.01)

(56) References Cited

U.S. PATENT DOCUMENTS

| | | | |
|---|---|---|---|
| 2012/0120964 A1 | 5/2012 | Koponen et al. | |
| 2013/0142199 A1 | 6/2013 | Mehta et al. | |
| 2013/0148657 A1 | 6/2013 | Salam et al. | |
| 2014/0086253 A1* | 3/2014 | Yong | H04L 12/4633 370/395.53 |
| 2016/0285736 A1 | 9/2016 | Gu | |

FOREIGN PATENT DOCUMENTS

| | | |
|---|---|---|
| CN | 102413060 A | 4/2012 |
| CN | 102957619 A | 3/2013 |
| CN | 103179228 A | 6/2013 |
| CN | 103200069 A | 7/2013 |
| CN | 103259724 A | 8/2013 |
| WO | 2013170790 A1 | 11/2013 |

OTHER PUBLICATIONS

Edwards, A., et al., "Diverter: A New Approach to Networking Within Virtualized Infrastructures," WREN, Aug. 21, 2009, pp. 103-110.
Casado, M., et al., "Fabric: A Retrospective on Evolving SDN," HotSDN, Aug. 13, 2012, pp. 85-89.
Greenberg, A., et al., "VL2: A Scalable and Flexible Data Center Network," SIGCOMM, Aug. 17-21, 2009, 12 pages.
Kim, C., et al., "Floodless in Seattle: A Scalable Ethernet Architecture for Large Enterprises," SIGCOMM, Aug. 17-22, 2008, 12 pages.
Mysore, R., et al., "PortLand: A Scalable Fault-Tolerant Layer 2 Data Center Network Fabric," SIGCOMM, Aug. 17-21, 2009, 12 pages.
Mudigonda, J., et al., "NetLord: A Scalable Multi-Tenant Network Architecture for Virtualized Datacenters," SIGCOMM, Aug. 15-19, 2011, pp. 62-73.
Hao, F., et al., "Enhancing Dynamic Cloud-based Services using Network Virtualization," VISA, Aug. 17, 2009, pp. 37-44.
Foreign Communication From a Counterpart Application, PCT Application No. PCT/CN2014/070931, English Translation of International Search Report dated Jun. 24, 2014, 2 pages.
Foreign Communication From a Counterpart Application, PCT Application No. PCT/CN2014/070931, English Translation of Written Opinion dated Jun. 24, 2014, 7 pages.
Machine Translation and Abstract of Chinese Publication No. CN102413060, dated Apr. 11, 2012, 27 pages.
Machine Translation and Abstract of Chinese Publication No. CN103200069, dated Jul. 10, 2013, 26 pages.
Foreign Communication From a Counterpart Application, Chinese Application No. 201480000180.1, Chinese Office Action dated Mar. 5, 2018, 5 pages.

* cited by examiner

ADDRESS ACQUIRING METHOD AND NETWORK VIRTUALIZATION EDGE DEVICE

CROSS-REFERENCE TO RELATED APPLICATION

This application is a continuation of International Application No. PCT/CN2014/070931, filed on Jan. 20, 2014, which is hereby incorporated by reference in its entirety.

TECHNICAL FIELD

The present disclosure relates to network communications technologies, and in particular, to an address acquiring method and a network virtualization edge device.

BACKGROUND

With massive deployment of virtual machines in a data center, a technical solution of abstracting a virtual overlay network by using a physical network tunnel attracts extensive attention. In an existing overlay network virtualization technology, a network virtualization edge (NVE) device is located at a boundary between a virtual network and a physical network, and is responsible for transmitting a packet, which is sent by a host, to another host by using the physical network, so as to implement communication between the hosts, where the virtual network is connected to at least one NVE device, and the NVE device is connected to at least one host by using a switching device in the virtual network. When communication is performed between hosts, the NVE device needs to perform tunnel encapsulation for a packet that is sent by a host to the virtual network, and transmit the packet to another host by using the physical network. When performing the tunnel encapsulation, the NVE device needs to determine an NVE device corresponding to a destination host so that the packet can be sent to the destination host.

Currently, the NVE device uses the following method to determine the NVE device corresponding to the destination host: performing packet learning based on a virtual extensible local area network (VXLAN) control plane, and recording a correspondence between a host and an NVE device by learning a multicast packet or a broadcast packet sent by another NVE device. However, this method is dependent on a large number of multicast packets or broadcast packets, which imposes greater processing pressure on a large-scale physical network.

SUMMARY

In view of the foregoing, embodiments of the present disclosure provide a network virtualization method and a network virtualization edge device to reduce processing pressure on a physical network.

According to a first aspect, an embodiment of the present disclosure provides a network virtualization edge device, including a receiving unit configured to receive an address resolution request packet sent by a source host, where the address resolution request packet includes an Internet Protocol (IP) address of a destination host; a first processing unit configured to determine another NVE device according to the IP address of the destination host, where the another NVE device stores a correspondence between the IP address of the destination host and a Media Access Control (MAC) address of the destination host and a correspondence between the IP address of the destination host and an IP address of a destination NVE device corresponding to the destination host; and a second processing unit configured to obtain the MAC address of the destination host and the IP address of the destination NVE device corresponding to the destination host from the another NVE device according to the IP address of the destination host.

In a first possible implementation manner of the first aspect, the first processing unit is configured to determine the another NVE device according to the IP address of the destination host by using a distributed hash table search algorithm.

With reference to the first possible implementation manner of the first aspect, in a second possible implementation manner of the first aspect, the second processing unit further includes a storage module and an address acquiring module, where the storage module is configured to query locally the MAC address of the destination host corresponding to the IP address of the destination host; and the address acquiring module is configured to obtain the MAC address of the destination host and the IP address of the destination NVE device corresponding to the destination host from the another NVE device according to the IP address of the destination host when the storage module fails to query the MAC address of the destination host.

With reference to the first aspect or the first possible implementation manner of the first aspect or the second possible implementation manner of the first aspect, in a third possible implementation manner of the first aspect, the NVE device further includes a first sending unit, a packet encapsulating unit, and a second sending unit, where the first sending unit is configured to send a response packet of the address resolution request packet to the source host, where the response packet of the address resolution request packet includes the MAC address of the destination host, or send an address resolution request announcement packet to all hosts managed by the NVE device, where the address resolution request announcement packet includes the MAC address of the destination host; the receiving unit is further configured to receive a data packet sent by the source host, where the data packet includes the IP address of the destination host; the packet encapsulating unit is configured to encapsulate the data packet, where the encapsulated data packet includes the IP address of the destination NVE device corresponding to the destination host; and the second sending unit is configured to send the encapsulated data packet to the destination NVE device.

According to a second aspect, an embodiment of the present disclosure provides an NVE device, including a receiving unit configured to receive an address resolution request packet sent by a source host, where the address resolution request packet includes an IP address of a destination host; a first processing unit configured to determine another NVE device according to the IP address of the destination host, where the another NVE device stores a correspondence between the IP address of the destination host and a MAC address of the destination host; and a second processing unit configured to obtain the MAC address of the destination host from the another NVE device according to the IP address of the destination host, where the receiving unit is further configured to receive a data packet, where the data packet includes the IP address of the destination host and the MAC address of the destination host; the first processing unit is further configured to determine the another NVE device according to the MAC address of the destination host, where the another NVE device stores a correspondence between the MAC address of the destination host and an IP address of a destination NVE device corresponding to the destination host; and the second processing unit is further configured to obtain the IP address of the destination NVE device from the another NVE device according to the MAC address of the destination host or the IP address of the destination host.

In a first possible implementation manner of the second aspect, the first processing unit is configured to determine the another NVE device according to the IP address of the destination host by using a distributed hash table search algorithm; or determine the another NVE device according to the MAC address of the destination host by using a distributed hash table search algorithm.

With reference to the first possible implementation manner of the second aspect, in a second possible implementation manner of the second aspect, the second processing unit further includes a storage module and an address acquiring module, where the storage module is configured to query locally the MAC address of the destination host corresponding to the IP address of the destination host; the address acquiring module is configured to obtain the MAC address of the destination host from the another NVE device according to the IP address of the destination host when the storage module fails to query the MAC address of the destination host; the storage module is further configured to query locally the IP address of the destination NVE device corresponding to the IP address of the destination host or corresponding to the MAC address of the destination host; and the address acquiring module is further configured to obtain the IP address of the destination NVE device from the another NVE device according to the IP address of the destination host or the MAC address of the destination host when the storage module fails to query the IP address of the destination NVE device.

With reference to the second aspect or the first possible implementation manner of the second aspect or the second possible implementation manner of the second aspect, in a third possible implementation manner of the second aspect, the NVE device further includes a first sending unit, where the first sending unit is configured to send a response packet of the address resolution request packet to the source host, where the response packet of the address resolution request packet includes the MAC address of the destination host, or send an address resolution request announcement packet to all hosts managed by the NVE device, where the address resolution request announcement packet includes the MAC address of the destination host.

With reference to the second aspect or the first possible implementation manner of the second aspect or the second possible implementation manner of the second aspect or the third possible implementation manner of the second aspect, in a fourth possible implementation manner of the second aspect, the second processing unit further includes a packet encapsulating unit and a second sending unit, where the packet encapsulating unit is configured to encapsulate the data packet, where the encapsulated data packet includes the IP address of the destination NVE device corresponding to the destination host; and the second sending unit is configured to send the encapsulated data packet to the destination NVE device.

With reference to the second aspect or the first possible implementation manner of the second aspect or the second possible implementation manner of the second aspect or the third possible implementation manner of the second aspect, in a fifth possible implementation manner of the second aspect, the second processing unit further includes a packet encapsulating unit and a second sending unit, where the packet encapsulating unit is configured to tunnel-encapsulate the data packet; and the second sending unit is configured to send the tunnel-encapsulated data packet to the another NVE device, so that the another NVE device sends the tunnel-encapsulated data packet to the destination NVE device.

According to a third aspect, an embodiment of the present disclosure provides an address acquiring method, including receiving, by an NVE device, an address resolution request packet sent by a source host, where the address resolution request packet includes an IP address of a destination host; determining, by the NVE device, another NVE device according to the IP address of the destination host, where the another NVE device stores a correspondence between the IP address of the destination host and a MAC address of the destination host and a correspondence between the IP address of the destination host and an IP address of a destination NVE device corresponding to the destination host; and obtaining, by the NVE device, the MAC address of the destination host and the IP address of the destination NVE device corresponding to the destination host from the another NVE device according to the IP address of the destination host.

In a first possible implementation manner of the third aspect, the determining, by the NVE device, another NVE device according to the IP address of the destination host includes determining, by the NVE device, the another NVE device according to the IP address of the destination host by using a distributed hash table search algorithm.

With reference to the first possible implementation manner of the third aspect, in a second possible implementation manner of the third aspect, the obtaining, by the NVE device, the MAC address of the destination host and the IP address of the destination NVE device corresponding to the destination host from the another NVE device according to the IP address of the destination host includes querying locally, by the NVE device, the MAC address of the destination host corresponding to the IP address of the destination host; and obtaining, by the NVE device, the MAC address of the destination host and the IP address of the destination NVE device corresponding to the destination host from the another NVE device according to the IP address of the destination host when the NVE device fails to query the MAC address of the destination host.

With reference to the third aspect or the first possible implementation manner of the third aspect or the second possible implementation manner of the third aspect, in a third possible implementation manner of the third aspect, the method further includes sending, by the NVE device, a response packet of the address resolution request packet to the source host, where the response packet of the address resolution request packet includes the MAC address of the destination host, or sending an address resolution request announcement packet to all hosts managed by the NVE device, where the address resolution request announcement packet includes the MAC address of the destination host; receiving, by the NVE device, a data packet sent by the source host, where the data packet includes the IP address of the destination host; encapsulating, by the NVE device, the data packet, where the encapsulated data packet includes the IP address of the destination NVE device corresponding to the destination host; and sending, by the NVE device, the encapsulated data packet to the destination NVE device.

According to a fourth aspect, an embodiment of the present disclosure provides an address acquiring method, including receiving, by an NVE device, an address resolution request packet sent by a source host, where the address resolution request packet includes an IP address of a destination host; determining, by the NVE device, another NVE device according to the IP address of the destination host, where the another NVE device stores a correspondence between the IP address of the destination host and a MAC address of the destination host; obtaining, by the NVE device, the MAC address of the destination host from the another NVE device according to the IP address of the destination host; receiving, by the NVE device, a data packet, where the data packet includes the IP address of the destination host and the MAC address of the destination host; determining, by the NVE device, the another NVE device according to the MAC address of the destination host, where the another NVE device stores a correspondence between the MAC address of the destination host and an IP address of a destination NVE device corresponding to the destination host; and obtaining, by the NVE device, the IP address of the destination NVE device from the another NVE device according to the MAC address of the destination host or the IP address of the destination host.

In a first possible implementation manner of the fourth aspect, the determining, by the NVE device, another NVE device according to the IP address of the destination host includes determining, by the NVE device, the another NVE device according to the IP address of the destination host by using a distributed hash table search algorithm; or determining the another NVE device according to the MAC address of the destination host by using a distributed hash table search algorithm.

With reference to the first possible implementation manner of the fourth aspect, in a second possible implementation manner of the fourth aspect, the obtaining, by the NVE device, the MAC address of the destination host from the another NVE device according to the IP address of the destination host includes querying locally, by the NVE device, the MAC address of the destination host corresponding to the IP address of the destination host; and obtaining, by the NVE device, the MAC address of the destination host from the another NVE device according to the IP address of the destination host when the NVE device fails to query the MAC address of the destination host; and the obtaining, by the NVE device, the IP address of the destination NVE device from the another NVE device according to the IP address of the destination host includes querying locally, by the NVE device, the IP address of the destination NVE device corresponding to the IP address of the destination host or corresponding to the MAC address of the destination host; and obtaining, by the NVE device, the IP address of the destination NVE device from the another NVE device according to the IP address of the destination host or the MAC address of the destination host when the NVE device fails to query the IP address of the destination NVE device.

With reference to the fourth aspect or the first possible implementation manner of the fourth aspect or the second possible implementation manner of the fourth aspect, in a third possible implementation manner of the fourth aspect, the method further includes sending, by the NVE device, a response packet of the address resolution request packet to the source host, where the response packet of the address resolution request packet includes the MAC address of the destination host; or sending, by the NVE device, an address resolution request announcement packet to all hosts managed by the NVE device, where the address resolution request announcement packet includes the MAC address of the destination host.

With reference to the fourth aspect or the first possible implementation manner of the fourth aspect or the second possible implementation manner of the fourth aspect or the third possible implementation manner of the fourth aspect, in a fourth possible implementation manner of the fourth aspect, the method further includes encapsulating, by the NVE device, the data packet, where the encapsulated data packet includes the IP address of the destination NVE device corresponding to the destination host; and sending, by the NVE device, the encapsulated data packet to the destination NVE device.

With reference to the fourth aspect or the first possible implementation manner of the fourth aspect or the second possible implementation manner of the fourth aspect or the third possible implementation manner of the fourth aspect, in a fifth possible implementation manner of the fourth aspect, the method further includes tunnel-encapsulating, by the NVE device, the data packet; and sending, by the NVE device, the tunnel-encapsulated data packet to the another NVE device, so that the another NVE device sends the tunnel-encapsulated data packet to the destination NVE device.

According to a fifth aspect, an embodiment of the present disclosure provides an NVE device, including a memory configured to store information that includes program code; and a processor configured to communicate with the memory and execute the program code so that the NVE device performs the method according to the third aspect.

According to a sixth aspect, an embodiment of the present disclosure provides an NVE device, including a memory configured to store information that includes program code; and a processor configured to communicate with the memory and execute the program code so that the network virtualization edge device performs the method according to the fourth aspect.

According to the foregoing technical solutions, an NVE device determines a query point for querying a correspondence between a host and an NVE device, and then obtains required address information from the query point. Therefore, compared with a method in the prior art in which a large number of multicast packets or broadcast packets are used to query address information, the technical solutions of the present disclosure can reduce dependency on multicast packets or broadcast packets and reduce processing pressure on a physical network.

BRIEF DESCRIPTION OF THE DRAWINGS

To describe the technical solutions in the embodiments of the present disclosure more clearly, the following briefly introduces the accompanying drawings required for describing the embodiments. The accompanying drawings in the following description show merely some embodiments of the present disclosure, and a person of ordinary skill in the art may still derive other drawings from these accompanying drawings without creative efforts.

DETAILED DESCRIPTION

To make the technical solutions in the present disclosure more comprehensible, the following describes the embodiments of the present disclosure in detail with reference to the accompanying drawings.

It should be clear that the described embodiments are merely some but not all of the embodiments of the present disclosure. All other embodiments obtained by a person of ordinary skill in the art based on the embodiments of the present disclosure without creative efforts shall fall within the protection scope of the present disclosure.

Figure 1:
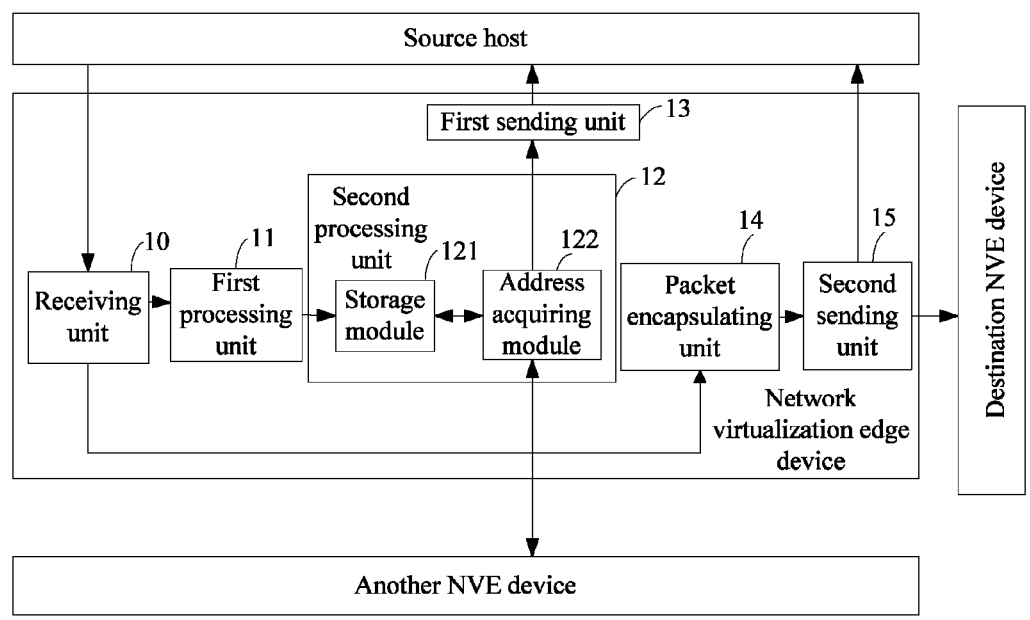
FIG. 1 is a functional block diagram of a network virtualization edge device 1 according to an embodiment of the present disclosure.

Refer to FIG. 1, which is a functional block diagram of Embodiment 1 of a network virtualization edge device according to an embodiment of the present disclosure. As shown in FIG. 1, the network virtualization edge device includes a receiving unit 10 configured to receive an address resolution request packet sent by a source host, where the address resolution request packet includes an IP address of a destination host; a first processing unit 11 configured to determine another NVE device according to the IP address of the destination host, where the another NVE device stores a correspondence between the IP address of the destination host and a MAC address of the destination host and a correspondence between the IP address of the destination host and an IP address of a destination NVE device corresponding to the destination host; and a second processing unit 12 configured to obtain the MAC address of the destination host and the IP address of the destination NVE device corresponding to the destination host from the another NVE device according to the IP address of the destination host.

The first processing unit 11 is configured to determine the another NVE device according to the IP address of the destination host by using a distributed hash table search algorithm.

The second processing unit 12 further includes a storage module 121 and an address acquiring module 122, where the storage module 121 is configured to query locally the MAC address of the destination host corresponding to the IP address of the destination host; and the address acquiring module 122 is configured to obtain the MAC address of the destination host and the IP address of the destination NVE device corresponding to the destination host from the another NVE device according to the IP address of the destination host when the storage module fails to query the MAC address of the destination host.

The NVE device further includes a first sending unit 13, a packet encapsulating unit 14, and a second sending unit 15, where the first sending unit 13 is configured to send a response packet of the address resolution request packet to the source host, where the response packet of the address resolution request packet includes the MAC address of the destination host, or send an address resolution request announcement packet to all hosts managed by the NVE device, where the address resolution request announcement packet includes the MAC address of the destination host; the receiving unit 10 is further configured to receive a data packet sent by the source host, where the data packet includes the IP address of the destination host; the packet encapsulating unit 14 is configured to encapsulate the data packet, where the encapsulated data packet includes the IP address of the destination NVE device corresponding to the destination host; and the second sending unit 15 is configured to send the encapsulated data packet to the destination NVE device.

Figure 2:
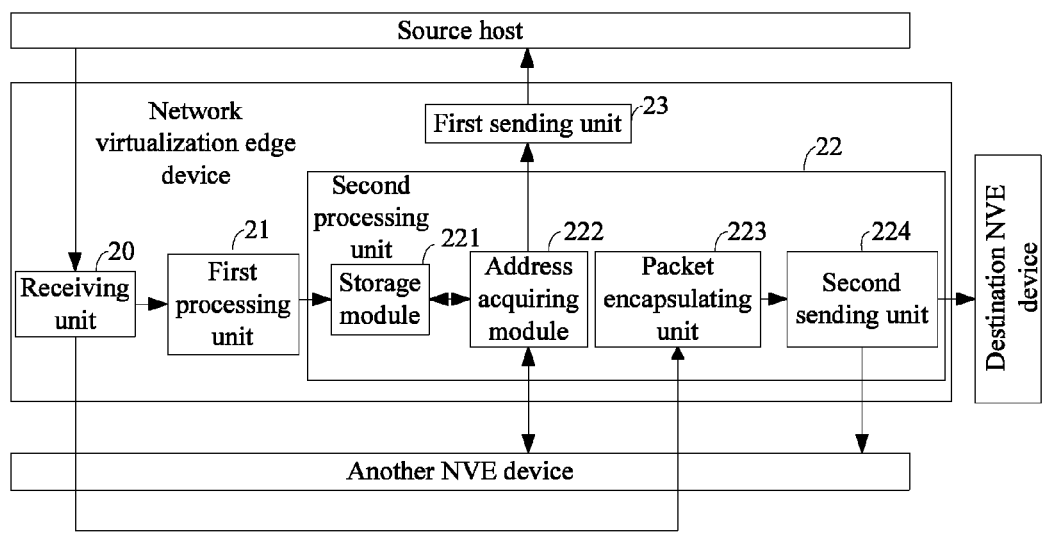
FIG. 2 is a functional block diagram of a network virtualization edge device 2 according to an embodiment of the present disclosure.

Refer to FIG. 2, which is a functional block diagram of Embodiment 2 of an NVE device according to an embodiment of the present disclosure. As shown in FIG. 2, the NVE device includes a receiving unit 20 configured to receive an address resolution request packet sent by a source host, where the address resolution request packet includes an IP address of a destination host; a first processing unit 21 configured to determine another NVE device according to the IP address of the destination host, where the another NVE device stores a correspondence between the IP address of the destination host and a MAC address of the destination host; and a second processing unit 22 configured to obtain the MAC address of the destination host from the another NVE device according to the IP address of the destination host, where the receiving unit 20 is further configured to receive a data packet, where the data packet includes the IP address of the destination host and the MAC address of the destination host; the first processing unit 21 is further configured to determine the another NVE device according to the MAC address of the destination host, where the another NVE device stores a correspondence between the MAC address of the destination host and an IP address of a destination NVE device corresponding to the destination host; and the second processing unit 22 is further configured to obtain the IP address of the destination NVE device from the another NVE device according to the MAC address of the destination host or the IP address of the destination host.

The first processing unit 21 is configured to determine the another NVE device according to the IP address of the destination host by using a distributed hash table search algorithm; or determine the another NVE device according to the MAC address of the destination host by using a distributed hash table search algorithm.

The second processing unit 22 further includes a storage module 221 and an address acquiring module 222, where the storage module 221 is configured to query locally the MAC address of the destination host corresponding to the IP address of the destination host; the address acquiring module 222 is configured to obtain the MAC address of the destination host from the another NVE device according to the IP address of the destination host when the storage module fails to query the MAC address of the destination host; the storage module 221 is further configured to query locally the IP address of the destination NVE device corresponding to the IP address of the destination host or corresponding to the MAC address of the destination host; and the address acquiring module 222 is further configured to obtain the IP address of the destination NVE device from the another NVE device according to the MAC address of the destination host when the storage module fails to query the IP address of the destination NVE device.

The NVE device further includes a first sending unit 23, where the first sending unit 23 is configured to send a response packet of the address resolution request packet to the source host, where the response packet of the address resolution request packet includes the MAC address of the destination host, or send an address resolution request announcement packet to all hosts managed by the NVE device, where the address resolution request announcement packet includes the MAC address of the destination host.

The second processing unit 22 further includes a packet encapsulating unit 223 and a second sending unit 224, where the packet encapsulating unit 223 is configured to encapsulate the data packet, where the encapsulated data packet includes the IP address of the destination NVE device corresponding to the destination host; and the second sending unit 224 is configured to send the encapsulated data packet to the destination NVE device.

Alternatively, the second processing unit 22 further includes a packet encapsulating unit 223 and a second sending unit 224, where the packet encapsulating unit 223 is configured to tunnel-encapsulate the data packet; and the second sending unit 224 is configured to send the tunnel-encapsulated data packet to the another NVE device, so that the another NVE device sends the tunnel-encapsulated data packet to the destination NVE device.

An embodiment of the present disclosure further provides a method embodiment for implementing each unit and each module in the foregoing device embodiments.

Figure 3:
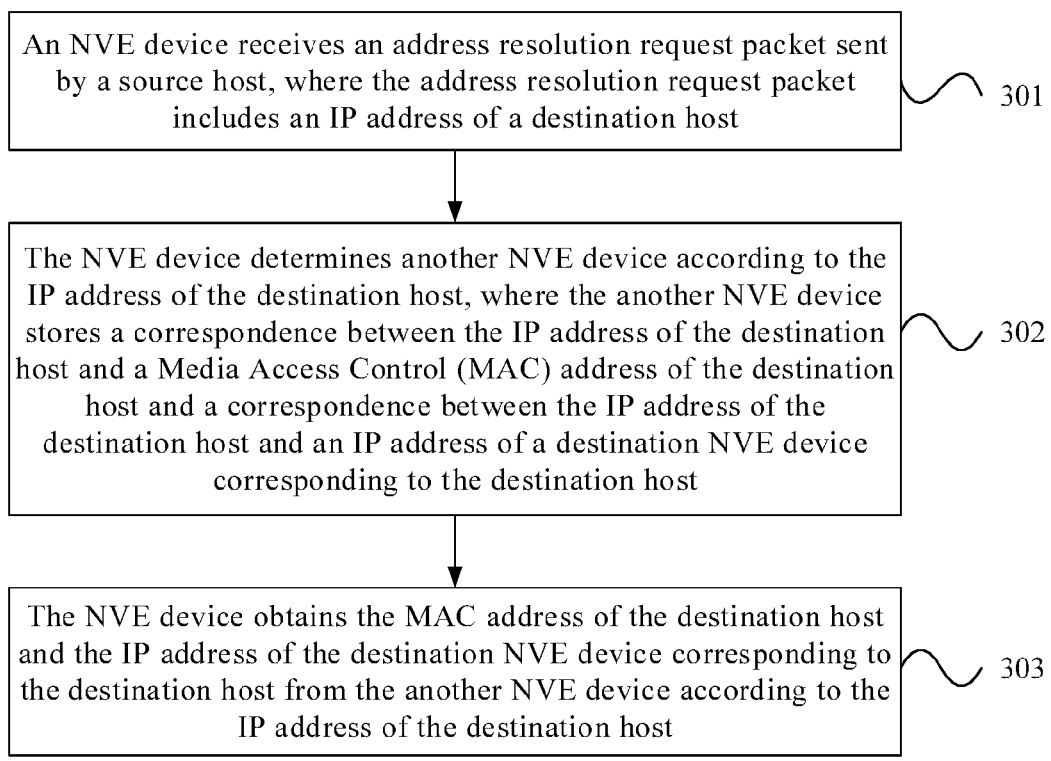
FIG. 3 is a schematic flowchart of an address acquiring method 1 according to an embodiment of the present disclosure.

An embodiment of the present disclosure illustrates an address acquiring method. An NVE device in this method is an NVE device shown in FIG. 1. Refer to FIG. 3, which is a schematic flowchart of an address acquiring method 1 according to an embodiment of the present disclosure. As shown in FIG. 3, the method includes the following steps.

Step 301: An NVE device receives an address resolution request packet sent by a source host, where the address resolution request packet includes an IP address of a destination host.

Figure 4:
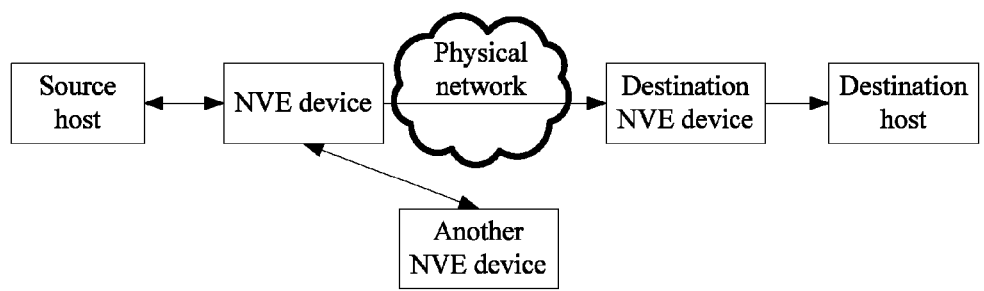
FIG. 4 is a first schematic diagram of a virtual network and a physical network according to an embodiment of the present disclosure.

Each NVE device has two sides. One side is connected to a virtual network, on which the NVE device may interact with a host. The other side is connected to a physical network, on which the NVE device may interact with another NVE device. Therefore, the NVE device is located at a boundary between the virtual network and the physical network. Refer to FIG. 4, which is a schematic diagram of a virtual network and a physical network according to an embodiment of the present disclosure. As shown in FIG. 4, a source host is connected to an NVE device, the source host and a destination host belong to a same virtual network, and a destination NVE device is connected to a destination host. The source host needs to send a packet to the destination host, but the NVE device corresponding to the source host does not know which NVE device is the NVE device corresponding to the destination host. Therefore, the NVE device needs to obtain the NVE device corresponding to the destination host from another NVE device.

The NVE device receives the address resolution request packet sent by the source host, where the address resolution request packet includes the IP address of the destination host.

Step 302: The NVE device determines another NVE device according to the IP address of the destination host, where the another NVE device stores a correspondence between the IP address of the destination host and a MAC address of the destination host and a correspondence between the IP address of the destination host and an IP address of a destination NVE device corresponding to the destination host.

A method in which the NVE device determines the another NVE device according to the IP address of the destination host may be that the NVE device determines the another NVE device according to the IP address of the destination host by using a distributed hash table (DHT) search algorithm.

For example, a method in which the NVE device determines the another NVE device according to the IP address of the destination host by using the distributed hash table search algorithm may be that an IP address of each host or each NVE device is a keyword; the NVE device performs hash computation on each keyword, and determines, according to a result of the hash computation, which NVE device is responsible for storing the IP address corresponding to the keyword. In the embodiment of the present disclosure, the another NVE device receives related information sent by the destination NVE device, for example, the IP address of the destination host, the MAC address of the destination host, and the destination NVE device corresponding to the destination host. The another NVE device stores the information so as to obtain a first correspondence and a second correspondence, where the first correspondence includes the correspondence between the IP address of the destination host and the MAC address of the destination host, and the second correspondence includes the correspondence between the IP address of the destination host and the IP address of the destination NVE device corresponding to the destination host. Therefore, the NVE device may perform hash computation on the IP address of the destination host by using the IP address of the destination host as a keyword, and determine, according to a result of the hash computation, the another NVE device that stores information indicating the NVE device corresponding to the IP address of the destination host.

The destination NVE device corresponding to the destination host refers to a destination NVE device that manages the destination host.

Step 303: The NVE device obtains the MAC address of the destination host and the IP address of the destination NVE device corresponding to the destination host from the another NVE device according to the IP address of the destination host.

According to the IP address of the destination host, the NVE device queries locally the MAC address of the destination host corresponding to the IP address of the destination host first; and if the NVE device fails to query the MAC address of the destination host, the NVE device obtains the MAC address of the destination host and the IP address of the destination NVE device corresponding to the destination host from the another NVE device according to the IP address of the destination host.

For example, the NVE device sends a query request message to the another NVE device that is determined, where the query request message carries the IP address of the destination host, so that the another NVE device sends the MAC address of the destination host corresponding to the IP address of the destination host and the IP address of the destination NVE device corresponding to the destination host to the NVE device.

Here, by using a characteristic that a source host generally sends an address resolution request packet to an NVE device before sending a data packet, the NVE device queries, after receiving the address resolution request packet, the MAC address of the destination host corresponding to the IP address of the destination host and the IP address of the destination NVE device corresponding to the destination host at the same time. Therefore, interaction between NVE devices can be reduced and efficiency in acquiring address information by the NVE device can be improved.

Optionally, after step 303, the foregoing method may further include sending, by the NVE device, a response packet of the address resolution request packet to the source host, where the response packet of the address resolution request packet includes the MAC address of the destination host, or sending an address resolution request announcement packet to all hosts managed by the NVE device, where the address resolution request announcement packet includes the MAC address of the destination host; receiving, by the NVE device, a data packet sent by the source host, where the data packet includes the IP address of the destination host; encapsulating, by the NVE device, the data packet, where the encapsulated data packet includes the IP address of the destination NVE device corresponding to the destination host; and sending, by the NVE device, the encapsulated data packet to the destination NVE device.

The address resolution request packet may include an Address Resolution Protocol (ARP) request packet or a Neighbor Discovery Protocol (NDP) request packet. Correspondingly, the response packet of the address resolution request packet may include an ARP response packet or an NDP response packet.

Embodiment 1

Figure 5:
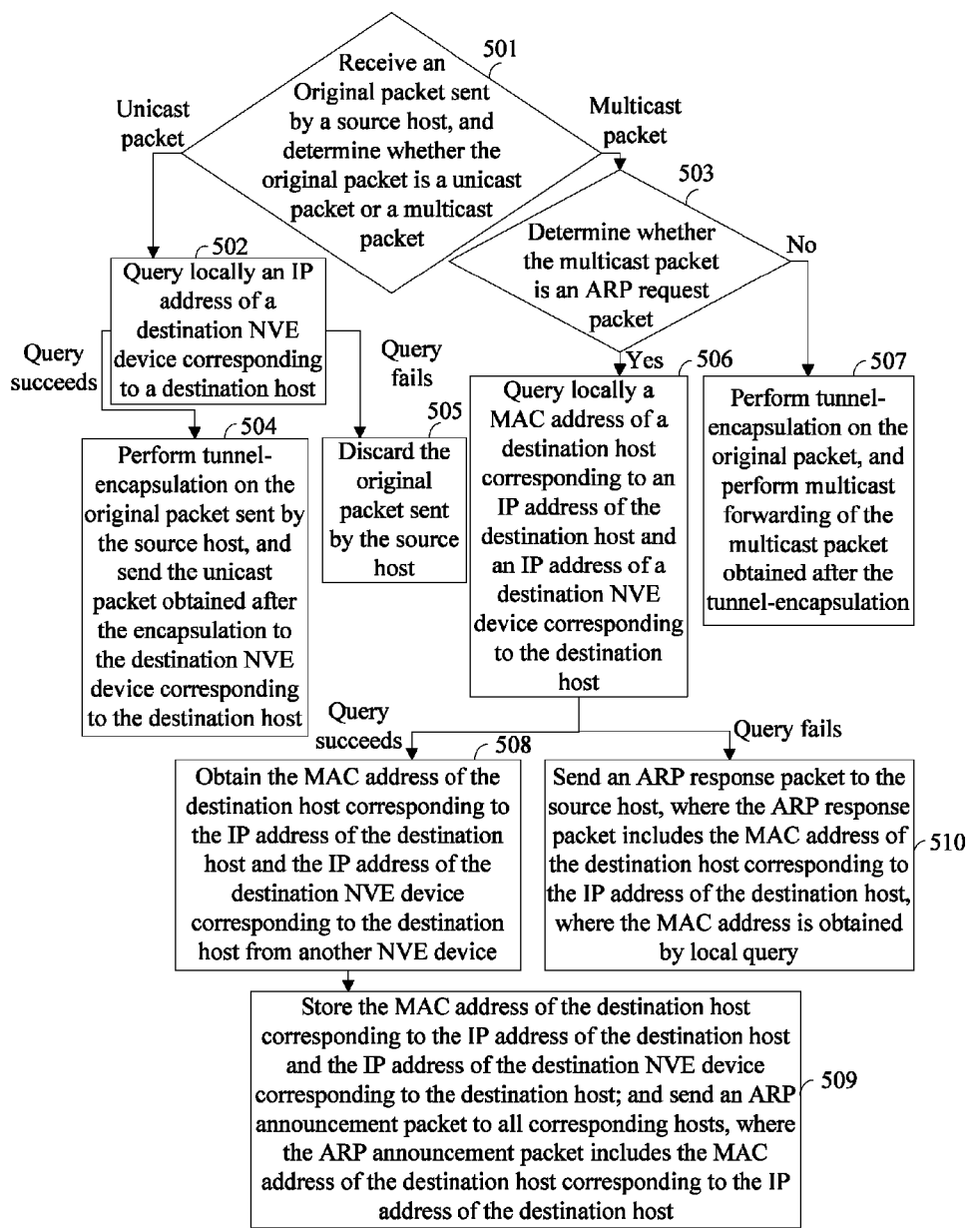
FIG. 5 is a schematic flowchart of Embodiment 1 of an address acquiring method according to an embodiment of the present disclosure.

Refer to FIG. 5, which is a schematic flowchart of Embodiment 1 of an address acquiring method according to an embodiment of the present disclosure. In this embodiment, that an address resolution request packet is an ARP request packet is used as an example for description. After receiving an ARP request packet, an NVE device queries both a MAC address of a destination host corresponding to an IP address of a destination host and an IP address of a destination NVE device corresponding to the destination host. As shown in FIG. 5, the method includes the following steps.

Step 501: An NVE device receives an original packet sent by a source host, where the original packet includes an IP address of a destination host; determines whether the original packet is a unicast packet or a multicast packet; and performs step 502 if the original packet is a unicast packet; or performs step 503 if the original packet is a multicast packet, where the unicast packet is equivalent to a data packet mentioned above.

Step 502: According to the IP address of the destination host, the NVE device queries locally an IP address of a destination NVE device corresponding to the destination host, and if the querying succeeds, performs step 504, or if the querying fails, performs step 505.

Step 503: The NVE device determines whether the multicast packet is an ARP request packet, and if the multicast packet is an ARP request packet, performs step 506, or if the multicast packet is not an ARP request packet, performs step 507.

Step 504: The NVE device performs, according to the found IP address of the destination NVE device corresponding to the destination host, tunnel-encapsulation on the unicast packet sent by the source host, and sends the unicast packet obtained after the encapsulation to the destination NVE device corresponding to the destination host, so that the destination NVE device performs tunnel-decapsulation on the unicast packet, and sends the packet obtained after the tunnel-decapsulation to the destination host. In this way, the source host sends the packet to the destination host successfully.

Step 505: The NVE device discards the unicast packet sent by the source host, and a current process ends.

Step 506: According to the IP address of the destination host, the NVE device queries locally the MAC address of the destination host corresponding to the IP address of the destination host and the IP address of the destination NVE device corresponding to the destination host, and if the querying fails, performs step 508, or if the querying succeeds, performs step 510.

Step 507: The NVE device performs tunnel-encapsulation on the multicast packet, and performs multicast forwarding of the multicast packet obtained after the tunnel-encapsulation, so that another NVE device in a virtual network receives the multicast packet, decapsulates the multicast packet to remove an outer packet header, and then forwards the packet obtained after the decapsulation to a host corresponding to the another NVE device itself.

Step 508: Because the NVE device cannot find required address information locally, the NVE device needs to obtain the required address information from another NVE device, and therefore, the NVE device finds the another NVE device by using a DHT search algorithm, and then obtains the MAC address of the destination host corresponding to the IP address of the destination host and the IP address of the destination NVE device corresponding to the destination host from the another NVE device.

Step 509: The NVE device stores the obtained MAC address of the destination host corresponding to the IP address of the destination host and the obtained IP address of the destination NVE device corresponding to the destination host; optionally, the NVE device may send an ARP announcement packet to all hosts corresponding to the NVE device, where the ARP announcement packet includes the MAC address of the destination host corresponding to the IP address of the destination host.

Step 510: The NVE device sends an ARP response packet to the source host, where the ARP response packet includes the MAC address of the destination host corresponding to the IP address of the destination host, where the MAC address is obtained by local querying.

Figure 6:
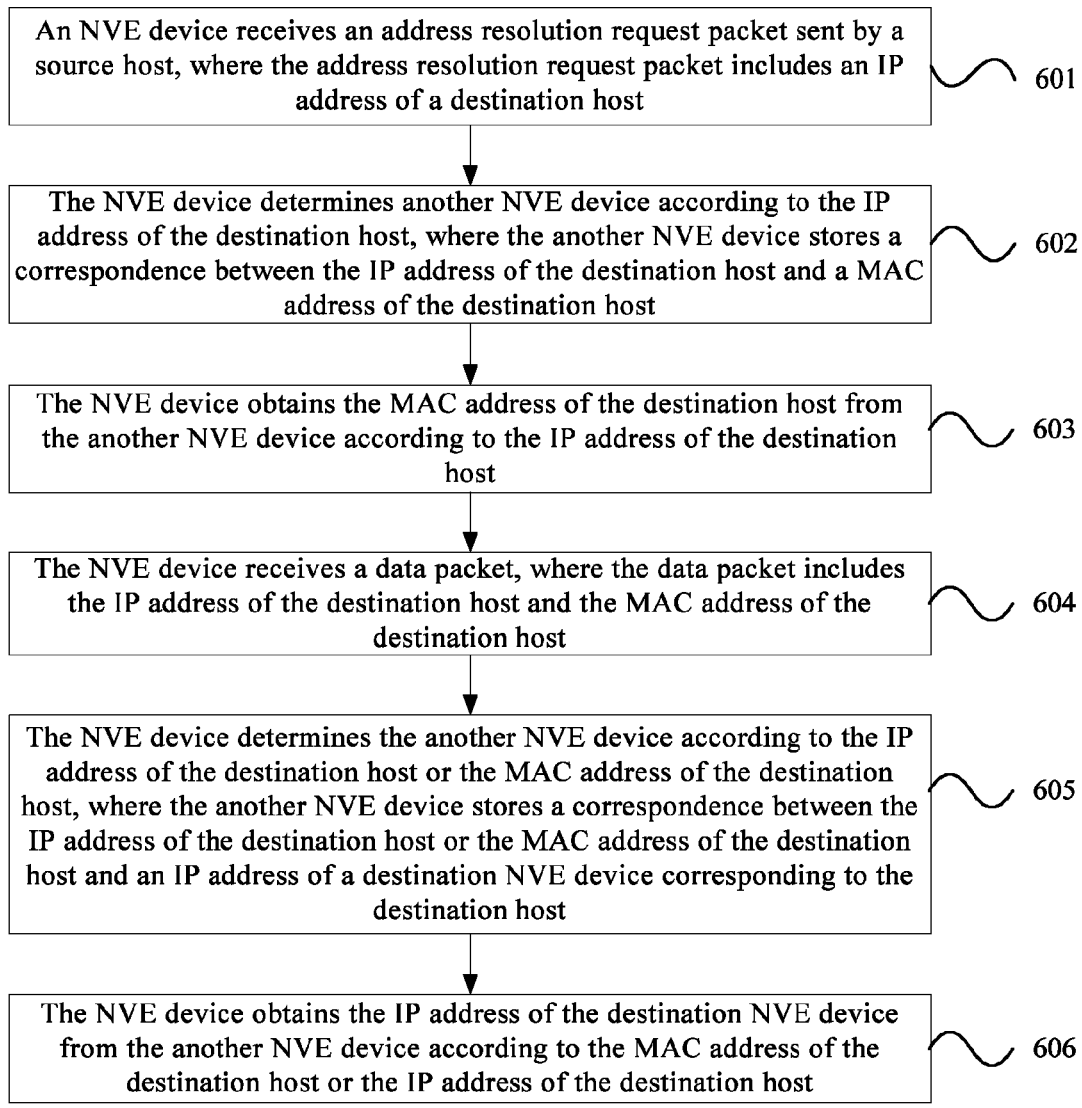
FIG. 6 is a schematic flowchart of an address acquiring method 2 according to an embodiment of the present disclosure.

The embodiment of the present disclosure illustrates an address acquiring method. An NVE device in this method is an NVE device shown in FIG. 2. Refer to FIG. 6, which is a schematic flowchart of an address acquiring method 2 according to an embodiment of the present disclosure. As shown in FIG. 6, the method includes the following steps.

Step 601: An NVE device receives an address resolution request packet sent by a source host, where the address resolution request packet includes an IP address of a destination host.

Step 602: The NVE device determines another NVE device according to the IP address of the destination host, where the another NVE device stores a correspondence between the IP address of the destination host and a MAC address of the destination host.

In this embodiment, when the address resolution request packet sent by the source host is received, the NVE device first determines the another NVE device that is used to obtain the MAC address of the destination host. A method in which the NVE device determines another NVE device according to the IP address of the destination host may be to determine the another NVE device according to the IP address of the destination host by using a distributed hash table search algorithm.

For example, a method in which the NVE device determines the another NVE device according to the IP address of the destination host by using the distributed hash table search algorithm may be that an IP address of each host or each NVE device is a keyword; the NVE device performs hash computation on each keyword, and determines, according to a result of the hash computation, which NVE device is responsible for storing the IP address corresponding to the keyword. In an embodiment of the present disclosure, another NVE device receives related information sent by the destination NVE device, for example, an IP address of the destination host and a MAC address of the destination host. The another NVE device stores the information so as to obtain a correspondence between the IP address of the destination host and the MAC address of the destination host. Therefore, the NVE device may perform hash computation on the IP address of the destination host by using the IP address of the destination host as a keyword, and determine, according to a result of the hash computation, the another NVE device that stores information indicating the NVE device corresponding to the IP address of the destination host.

Step 603: The NVE device obtains the MAC address of the destination host from the another NVE device according to the IP address of the destination host.

The NVE device queries locally, according to the IP address of the destination host, the MAC address of the destination host corresponding to the IP address of the destination host first; and if the NVE device fails to query the MAC address of the destination host, acquires the MAC address of the destination host from the another NVE device according to the IP address of the destination host.

Step 604: The NVE device receives a data packet, where the data packet includes the IP address of the destination host and the MAC address of the destination host.

Step 605: The NVE device determines the another NVE device according to the MAC address of the destination host, where the another NVE device stores a correspondence between the MAC address of the destination host and an IP address of a destination NVE device corresponding to the destination host.

In this embodiment, when the data packet is received, the NVE device then determines another NVE device that is used to obtain the MAC address of the destination host.

The NVE device may determine the another NVE device according to the MAC address of the destination host, where the another NVE device stores a correspondence between the MAC address of the destination host and the IP address of the destination NVE device corresponding to the destination host.

A method in which the NVE device determines the another NVE device according to the MAC address of the destination host may be that the NVE device determines the another NVE device according to the MAC address of the destination host by using a distributed hash table (DHT) search algorithm.

Step 606: The NVE device obtains the IP address of the destination NVE device from the another NVE device according to the MAC address of the destination host or the IP address of the destination host.

That the NVE device obtains the IP address of the destination NVE device from the another NVE device according to the MAC address of the destination host or the IP address of the destination host includes querying locally, by the NVE device, the MAC address of the destination host or the IP address of the destination NVE device corresponding to the IP address of the destination host; and if the NVE device fails to query the IP address of the destination NVE device, obtaining the IP address of the destination NVE device from the another NVE device according to the IP address of the destination host or the MAC address of the destination host.

Optionally, after step 606, the method further includes sending, by the NVE device, a response packet of the address resolution request packet to the source host, where the response packet of the address resolution request packet includes the MAC address of the destination host, or sending, by the NVE device, an address resolution request announcement packet to all hosts managed by the NVE device, where the address resolution request announcement packet includes the MAC address of the destination host.

Alternatively, after step 606, the method further includes the following.

Figure 7:
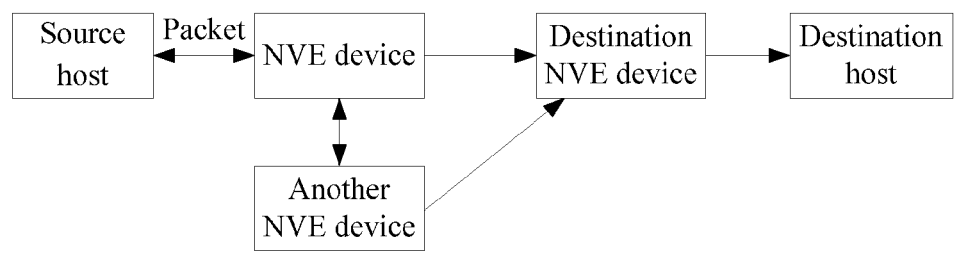
FIG. 7 is a second schematic diagram of a virtual network and a physical network according to an embodiment of the present disclosure.

Refer to FIG. 7, which is a second schematic diagram of a virtual network and a physical network according to an embodiment of the present disclosure. As shown in FIG. 7, the NVE device encapsulates the data packet, where the encapsulated data packet includes the IP address of the destination NVE device corresponding to the destination host; and the NVE device sends the encapsulated data packet to the destination NVE device.

Alternatively, after step 606, the method further includes the following.

As shown in FIG. 7, the NVE device tunnel-encapsulates the data packet; and the NVE device sends the tunnel-encapsulated data packet to the another NVE device, so that the another NVE device sends the tunnel-encapsulated data packet to the destination NVE device.

In the foregoing method, by using a characteristic that the source host generally sends an address resolution request packet to the NVE device first before sending a unicast data packet, the NVE device first queries, after receiving the address resolution request packet, the MAC address of the destination host corresponding to the IP address of the destination host, and the NVE device then queries, after receiving the unicast data packet sent by the host, the IP address of the destination NVE device corresponding to the destination host. That is, the operations of querying the two pieces of address information are performed separately.

Embodiment 2

Figure 8:
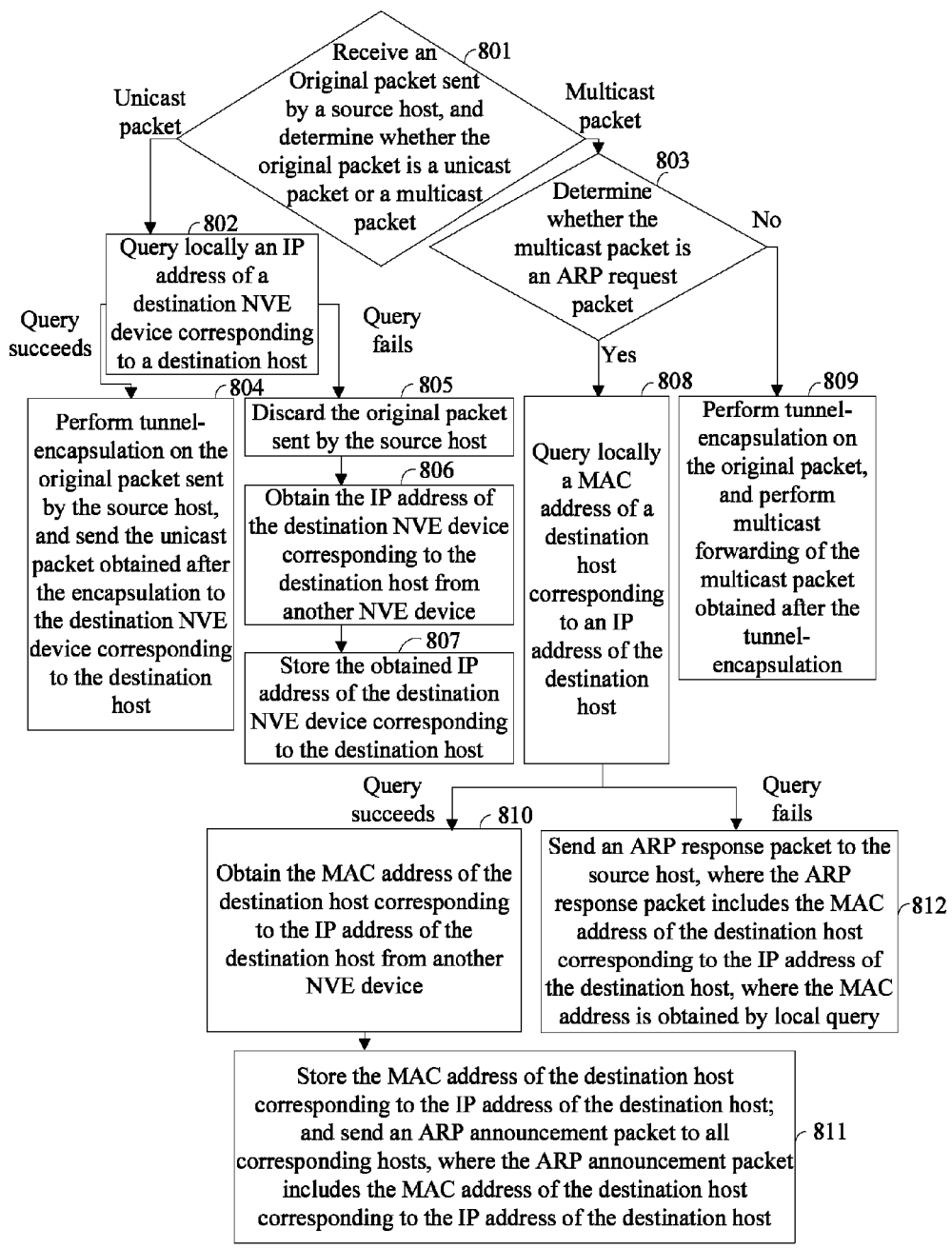
FIG. 8 is a schematic flowchart of Embodiment 2 of an address acquiring method according to an embodiment of the present disclosure.

Refer to FIG. 8, which is a schematic flowchart of Embodiment 2 of an address acquiring method according to an embodiment of the present disclosure. In this embodiment, that an address resolution request packet is an ARP request packet is used as an example for description. After receiving the ARP request packet, an NVE device queries a MAC address of a destination host corresponding to an IP address of the destination host, and when receiving a data packet, queries an IP address of a destination NVE device corresponding to the destination host. As shown in FIG. 8, the method includes the following steps.

Step 801: An NVE device receives an original packet sent by a source host, where the original packet includes an IP address of a destination host; determines whether the original packet is a unicast packet or a multicast packet; and if the original packet is a unicast packet, performs step 802; or if the original packet is a multicast packet, performs step 803, where the unicast packet is equivalent to the data packet mentioned above.

Step 802: According to the IP address of the destination host, the NVE device queries locally an IP address of a destination NVE device corresponding to the destination host, and if the querying succeeds, performs step 804, or if the querying fails, performs step 805.

Step 803: The NVE device determines whether the multicast packet is an ARP request packet, and if the multicast packet is an ARP request packet, performs step 808, or if the multicast packet is not an ARP request packet, performs step 809.

Step 804: The NVE device performs, according to the found IP address of the destination NVE device corresponding to the destination host, tunnel-encapsulation on the unicast packet sent by the source host, and sends the unicast packet obtained after the encapsulation to the destination NVE device corresponding to the destination host, so that the destination NVE device performs tunnel-decapsulation on the unicast packet, and sends the original packet obtained after the tunnel-decapsulation to the destination host. In this way, the source host sends the packet to the destination host successfully.

Step 805: The NVE device discards the original packet sent by the source host, and a current process ends.

Step 806: Because the NVE device cannot find required address information locally, the NVE device needs to obtain the required address information from another NVE device, and therefore, the NVE device finds the another NVE device by using a DHT search algorithm, and then obtains the IP address of the destination NVE device corresponding to the destination host from the another NVE device.

Step 807: The NVE device stores the obtained IP address of the destination NVE device corresponding to the destination host.

Step 808: According to the IP address of the destination host, the NVE device queries locally a MAC address of the destination host corresponding to the IP address of the destination host, and if the querying fails, performs step 812, or if the querying succeeds, performs step 810.

Step 809: The NVE device performs tunnel-encapsulation on the multicast packet, and performs multicast forwarding of the multicast packet obtained after the tunnel-encapsulation, so that another NVE device in a virtual network receives the multicast packet, decapsulates the multicast packet to remove an outer packet header, and then forwards the packet obtained after the decapsulation to a host corresponding to the another NVE device itself.

Step 810: Because the NVE device cannot find required address information locally, the NVE device needs to obtain the required address information from another NVE device, and therefore, the NVE device finds the another NVE device by using a DHT search algorithm, and then obtains the MAC address of the destination host corresponding to the IP address of the destination host from the another NVE device.

Step 811: The NVE device stores the obtained MAC address of the destination host corresponding to the IP address of the destination host; optionally, the NVE device sends an ARP announcement packet to all hosts corresponding to the NVE device, where the ARP announcement packet includes the MAC address of the destination host corresponding to the IP address of the destination host.

Step 812: The NVE device sends an ARP response packet to the source host, where the ARP response packet includes the MAC address of the destination host corresponding to the IP address of the destination host, where the MAC address is obtained by local querying.

Embodiment 3

Figure 9:
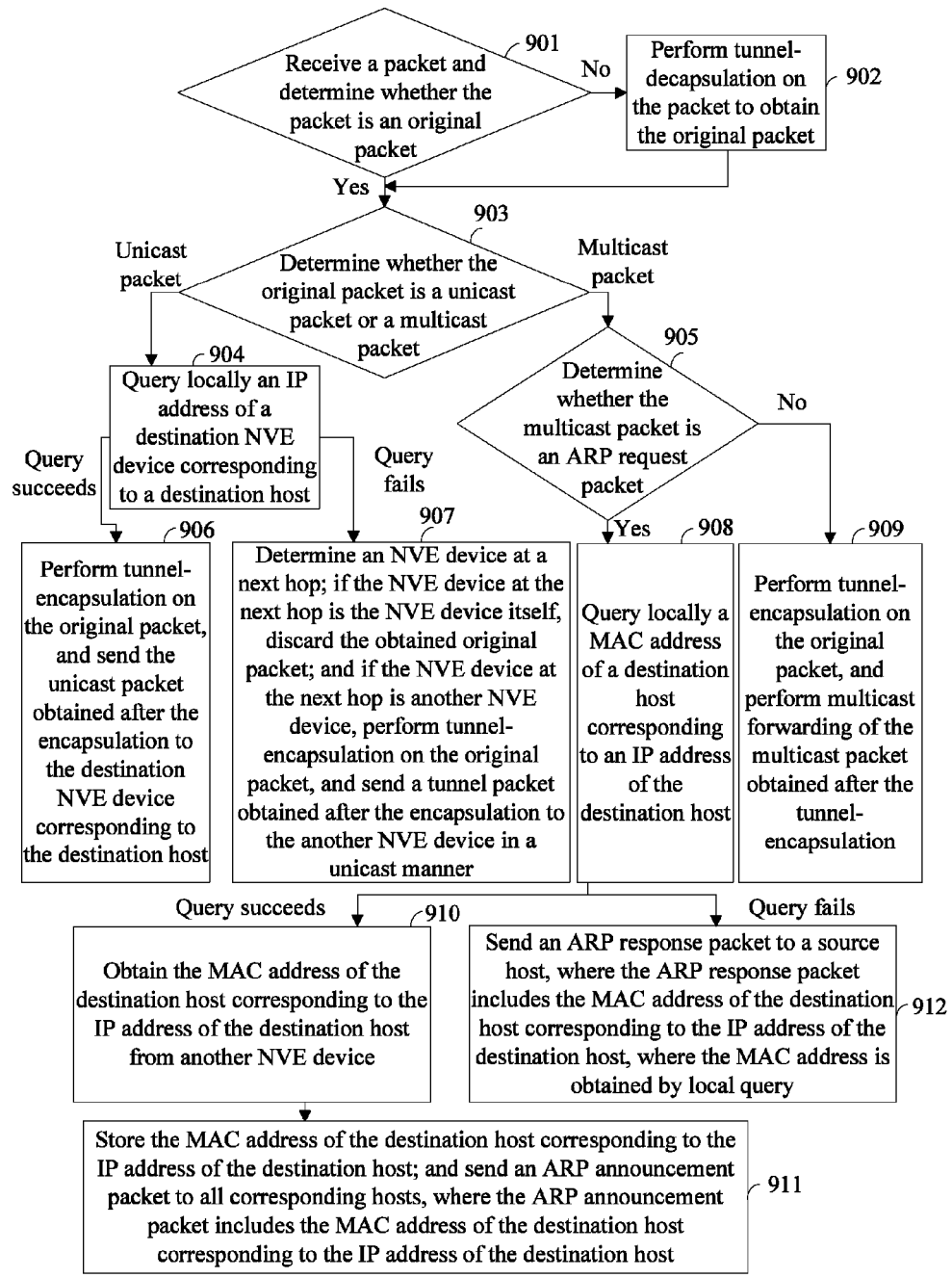
FIG. 9 is a schematic flowchart of Embodiment 3 of an address acquiring method according to an embodiment of the present disclosure.

Refer to FIG. 9, which is a schematic flowchart of Embodiment 3 of an address acquiring method according to an embodiment of the present disclosure. In this embodiment, that an address resolution request packet is an ARP request packet is used as an example for description. As shown in FIG. 9, the method includes the following steps.

Step 901: An NVE device receives a packet, where the packet includes an IP address of a destination host; and the NVE device determines whether the packet is an original packet sent by a source host corresponding to the NVE device, and if the packet is not the original packet, performs step 902, or if the packet is the original packet, performs step 903.

Step 902: If the packet received by the NVE device is not the original packet, it indicates that the packet is a tunnel packet sent by another NVE device, where the tunnel packet includes an original packet sent by a host; if the tunnel packet is a relay packet and a time to live (TTL) value in the tunnel packet is not 1, the NVE device performs tunnel-decapsulation on the packet to obtain the original packet. The TTL value represents a quantity of times that the packet can be forwarded by the NVE device, and is used to avoid infinite cyclic forwarding of the packet and avoid occurrence of a forwarding loop. The TTL has an initial value, and the initial value varies with protocols. The TTL value decreases by 1 every time the packet is forwarded by the NVE device, and the packet stops being forwarded when the TTL value is equal to 0. The NVE device needs to discard the packet that the NVE device stops forwarding, so as to avoid infinite cyclic forwarding of the packet.

Step 903: The NVE device determines whether the original packet is a unicast packet or a multicast packet, and if the original packet is a unicast packet, performs step 904, or if the original packet is a multicast packet, performs step 905, where the unicast packet is equivalent to the data packet mentioned above.

Step 904: According to the IP address of the destination host, the NVE device queries locally an IP address of a destination NVE device corresponding to the destination host, and if the querying succeeds, performs step 906, or if the querying fails, performs step 907.

Step 905: The NVE device determines whether the multicast packet is an ARP request packet, and if the multicast packet is an ARP request packet, performs step 908, or if the multicast packet is not an ARP request packet, performs step 909.

Step 906: The NVE device performs, according to the found IP address of the destination NVE device corresponding to the destination host, tunnel-encapsulation on the obtained original packet, and sends, in a unicast manner, a tunnel packet obtained after the encapsulation to the destination NVE device corresponding to the destination host, so that the destination NVE device performs tunnel-decapsulation on the tunnel packet, and sends the original packet obtained after the tunnel-decapsulation to the destination host.

Step 907: The NVE device determines another NVE device at a next hop by using a DHT search algorithm. If the NVE device at the next hop is the NVE device itself, the NVE device may discard the obtained original packet; if the NVE device at the next hop is another NVE device, the NVE device performs tunnel-encapsulation on the original packet, and sends a tunnel packet obtained after the encapsulation to the another NVE device in a unicast manner. Here, if the original packet obtained by the NVE device is obtained according to the relay packet, the TTL value in the tunnel packet is equal to the TTL value in the original packet minus 1; if the original packet obtained by the NVE device is an original packet sent by the source host corresponding to the NVE device, the TTL value in the tunnel packet is set to the initial value.

It should be noted that for Embodiment 1 to Embodiment 3 of the present disclosure, a purpose of the DHT search algorithm is to find another NVE device. In this embodiment, if the NVE device at the next hop found by the NVE device by using the DHT search algorithm is the NVE device itself, the NVE device may discard the original packet or flood the original packet to another NVE device.

Step 908: According to the IP address of the destination host, the NVE device queries locally a MAC address of the destination host corresponding to the IP address of the destination host, and if the querying fails, performs step 910, or if the querying succeeds, performs step 912.

Step 909: The NVE device performs tunnel-encapsulation on the original packet, and performs multicast forwarding of the tunnel packet obtained after the tunnel-encapsulation, so that multiple other NVE devices in a virtual network receive the multicast packet, decapsulate the multicast packet to remove an outer packet header, and then forward the packet obtained after the decapsulation to hosts corresponding to the other NVE devices themselves.

Step 910: Because the NVE device cannot find required address information locally, the NVE device needs to obtain the required address information from another NVE device, and therefore, the NVE device finds the another NVE device by using a DHT search algorithm, and then obtains the MAC address of the destination host corresponding to the IP address of the destination host from the another NVE device.

Step 911: The NVE device stores the obtained MAC address of the destination host corresponding to the IP address of the destination host; optionally, the NVE device sends an ARP announcement packet to all hosts corresponding to the NVE device, where the ARP announcement packet includes the MAC address of the destination host corresponding to the IP address of the destination host.

Step 912: The NVE device sends an ARP response packet to the source host corresponding to the NVE device, where the ARP response packet includes the MAC address of the destination host corresponding to the IP address of the destination host, where the MAC address is obtained by local querying.

Figure 10:
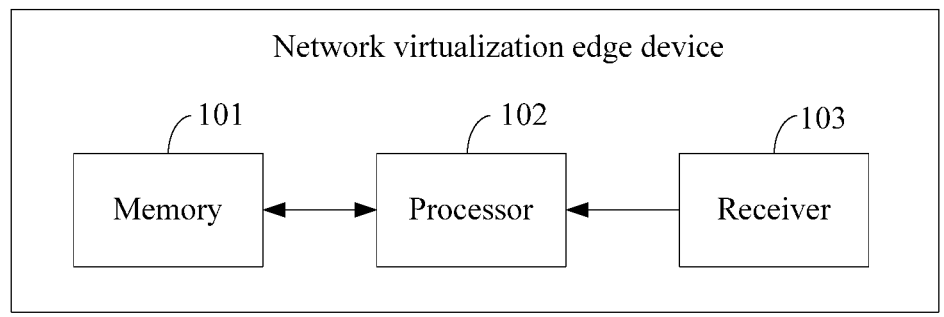
FIG. 10 is a schematic diagram of a structure of a network virtualization edge device 1 according to an embodiment of the present disclosure.

Refer to FIG. 10, which is a schematic structural diagram of Embodiment 1 of a network virtualization edge device according to an embodiment of the present disclosure. As shown in FIG. 10, the network virtualization edge device includes a receiver 103 configured to receive an address resolution request packet sent by a source host, where the address resolution request packet includes an IP address of a destination host; a memory 101 configured to store information that includes program code; and a processor 102, which communicates with the memory 101 and the receiver 103 and is configured to execute the program code so that the network virtualization edge device performs the following method: determining another NVE device according to the IP address of the destination host, where the another NVE device stores a correspondence between the IP address of the destination host and a MAC address of the destination host and a correspondence between the IP address of the destination host and an IP address of a destination NVE device corresponding to the destination host; and obtaining the MAC address of the destination host and the IP address of the destination NVE device corresponding to the destination host from the another NVE device according to the IP address of the destination host.

The network virtualization edge device may perform the method in the foregoing method embodiment 1.

Figure 11:
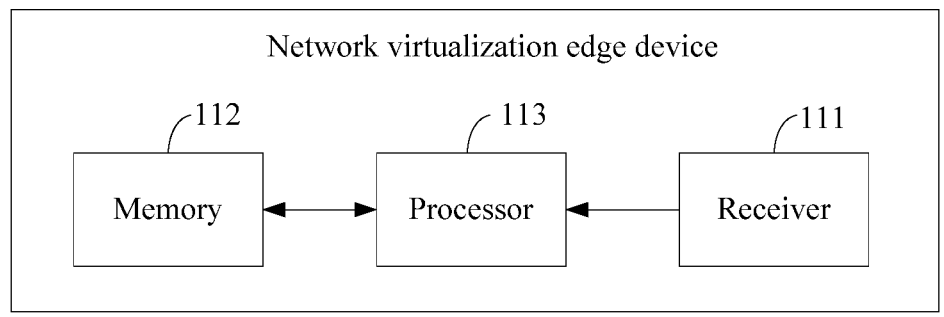
FIG. 11 is a schematic diagram of a structure of a network virtualization edge device 2 according to an embodiment of the present disclosure.

Refer to FIG. 11, which is a schematic structural diagram of Embodiment 2 of a network virtualization edge device according to an embodiment of the present disclosure. As shown in FIG. 11, the network virtualization edge device includes a receiver 111 configured to receive an address resolution request packet sent by a source host, where the address resolution request packet includes an IP address of a destination host; and further configured to receive a data packet, where the data packet includes the IP address of the destination host and a MAC address of the destination host; a memory 112 configured to store information that includes program code; and a processor 113, which communicates with the receiver 111 and the memory 112 and is configured to execute the program code so that the network virtualization edge device performs the following method: determining another NVE device according to the IP address of the destination host, where the another NVE device stores a correspondence between the IP address of the destination host and a MAC address of the destination host; obtaining the MAC address of the destination host from the another NVE device according to the IP address of the destination host; determining the another NVE device according to the MAC address of the destination host, where the another NVE device stores a correspondence between the MAC address of the destination host and an IP address of a destination NVE device corresponding to the destination host; and obtaining the IP address of the destination NVE device from the another NVE device according to the MAC address of the destination host or the IP address of the destination host.

The network virtualization edge device may perform the method in the foregoing method embodiment 2 and method embodiment 3.

The technical solutions provided in the embodiments of the present disclosure bring the following beneficial effects.

1. In the embodiments of the present disclosure, an NVE device determines a query point for querying a correspondence between a host and the NVE device, and then obtains required address information from the query point. Therefore, compared with a method in the prior art in which a large number of multicast packets or broadcast packets are used to query information, the technical solution of the present disclosure can reduce dependency on multicast packets or broadcast packets and reduce processing pressure on a physical network.

2. In the prior art, a fixed server may be used as a query point, and all NVE devices query required address information from the query point. However, because there is only one query point, if the query point is faulty or breaks down due to an attack, all NVE devices on a network are unable to query address information and thus unable to work normally. In addition, as processing capabilities of a single query point, such as a quantity of queries processed in a unit time, are limited, the query point tends to be a performance bottleneck and is hardly expansible. Therefore, in the embodiments of the present disclosure, correspondences may be stored on each NVE device in a distributed manner, without relying on a centralized controller for storing the correspondences, thereby solving the foregoing defect of the prior art.

3. In the technical solutions provided in the embodiments of the present disclosure, an ARP response packet or an ARP announcement packet itself should be sent by a destination host, but in the embodiments of the present disclosure, the packet is sent by an NVE device, that is, processed by the NVE device by proxy. Therefore, the embodiments of the present disclosure support deployment of a protocol proxy.

The foregoing descriptions are merely exemplary embodiments of the present disclosure, but are not intended to limit the present disclosure. Any modification, equivalent replacement, or improvement made without departing from the spirit and principle of the present disclosure should fall within the protection scope of the present disclosure.

What is claimed is:

1. An address acquiring and data packet sending method, wherein the method comprises:
   receiving, by a network virtualization edge (NVE) device, an address resolution request packet from a source host, wherein the address resolution request packet comprises an Internet Protocol (IP) address of a destination host;
   determining, by the NVE device, another NVE device according to the IP address of the destination host, wherein the another NVE device stores a correspondence between the IP address of the destination host and a Media Access Control (MAC) address of the destination host and a correspondence between the IP address of the destination host and an IP address of a destination NVE device corresponding to the destination host;
   obtaining, by the NVE device, the MAC address of the destination host and the IP address of the destination NVE device corresponding to the destination host from the another NVE device according to the IP address of the destination host;
   sending, by the NVE device, a response packet of the address resolution request packet to the source host, wherein the response packet of the address resolution request packet comprises the MAC address of the destination host;
   receiving, by the NVE device, the data packet from the source host, wherein the data packet comprises the IP address of the destination host;
   encapsulating, by the NVE device, the data packet to produce an encapsulated data packet, wherein the encapsulated data packet comprises the IP address of the destination NVE device corresponding to the destination host; and
   sending, by the NVE device, the encapsulated data packet to the destination NVE device.

2. The method according to claim 1, wherein determining, by the NVE device, the another NVE device according to the IP address of the destination host comprises determining, by the NVE device, the another NVE device according to the IP address of the destination host using a distributed hash table search algorithm.

3. The method according to claim 1, wherein the method further comprises sending, by the NVE device, an address resolution request announcement packet to all hosts managed by the NVE device, and wherein the address resolution request announcement packet comprises the MAC address of the destination host.

4. The method according to claim 1, wherein the source host and destination host are located in a virtual network, wherein the NVE device is located at a boundary between the virtual network and a physical network, and wherein encapsulating, by the NVE device, the data packet comprises tunnel encapsulating the data packet.

5. An address acquiring and data packet sending method, wherein the method comprises:
   receiving, by a network virtualization edge (NVE) device, an address resolution request packet from a source host, wherein the address resolution request packet comprises an Internet Protocol (IP) address of a destination host;
   determining, by the NVE device, another NVE device according to the IP address of the destination host, wherein the another NVE device stores a correspondence between the IP address of the destination host and a Media Access Control (MAC) address of the destination host;
   obtaining, by the NVE device, the MAC address of the destination host from the another NVE device according to the IP address of the destination host;
   receiving, by the NVE device, the data packet, wherein the data packet comprises the IP address of the destination host and the MAC address of the destination host;
   determining, by the NVE device, the another NVE device according to the MAC address of the destination host, wherein the another NVE device stores a correspondence between the MAC address of the destination host and an IP address of a destination NVE device corresponding to the destination host;
   obtaining, by the NVE device, the IP address of the destination NVE device from the another NVE device according to the MAC address of the destination host or the IP address of the destination host;
   encapsulating, by the NVE device, the data packet to produce an encapsulated data packet, wherein the encapsulated data packet comprises the IP address of the destination NVE device corresponding to the destination host; and
   sending, by the NVE device, the encapsulated data packet to the destination NVE device.

6. The method according to claim 5, wherein determining, by the NVE device, the another NVE device according to the IP address of the destination host comprises determining, by the NVE device, the another NVE device according to the IP address of the destination host or the MAC address of the destination host, using a distributed hash table search algorithm.

7. The method according to claim 5, wherein the method further comprises sending, by the NVE device, a response packet of the address resolution request packet to the source host, wherein the response packet of the address resolution request packet comprises the MAC address of the destination host.

8. The method according to claim 5, wherein the method further comprises sending, by the NVE device, an address resolution request announcement packet to all hosts managed by the NVE device, wherein the address resolution request announcement packet comprises the MAC address of the destination host.

9. The method according to claim 5, wherein the source host and destination host are located in a virtual network, wherein the NVE device is located at a boundary between the virtual network and a physical network, and wherein encapsulating, by the NVE device, the data packet comprises tunnel encapsulating the data packet.

10. A network virtualization edge (NVE) device, wherein the NVE device comprises:
    a memory configured to store information that comprises program code; and
    a processor configured to communicate with the memory and execute the program code to:

receive an address resolution request packet from a source host, wherein the address resolution request packet comprises an Internet Protocol (IP) address of a destination host;

determine another NVE device according to the IP address of the destination host, wherein the another NVE device stores a correspondence between the IP address of the destination host and a Media Access Control (MAC) address of the destination host and a correspondence between the IP address of the destination host and an IP address of a destination NVE device corresponding to the destination host;

obtain the MAC address of the destination host and the IP address of the destination NVE device corresponding to the destination host from the another NVE device according to the IP address of the destination host;

send a response packet of the address resolution request packet to the source host, wherein the response packet of the address resolution request packet comprises the MAC address of the destination host;

receive a data packet from the source host, wherein the data packet comprises the IP address of the destination host;

encapsulate the data packet to produce an encapsulated data packet, wherein the encapsulated data packet comprises the IP address of the destination NVE device corresponding to the destination host; and send the encapsulated data packet to the destination NVE device.

11. The NVE device according to claim 10, wherein when determining another NVE device according to the IP address of the destination host, the processor is configured to execute the program code further to determine the another NVE device according to the IP address of the destination host using a distributed hash table search algorithm.

12. The NVE device according to claim 10, wherein the processor is configured to execute the program code further to send an address resolution request announcement packet to all hosts managed by the NVE device, wherein the address resolution request announcement packet comprises the MAC address of the destination host.

13. The NVE device according to claim 10, wherein the source host and destination host are located in a virtual network, wherein the NVE device is located at a boundary between the virtual network and a physical network, and wherein encapsulating the data packet comprises tunnel encapsulating the data packet.

14. A network virtualization edge (NVE) device, wherein the NVE device comprises:
a memory configured to store information that comprises program code; and
a processor configured to communicate with the memory and execute the program code to:

receive an address resolution request packet from a source host, wherein the address resolution request packet comprises an Internet Protocol (IP) address of a destination host;

determine another NVE device according to the IP address of the destination host, wherein the another NVE device stores a correspondence between the IP address of the destination host and a Media Access Control (MAC) address of the destination host;

obtain the MAC address of the destination host from the another NVE device according to the IP address of the destination host;

receive a data packet, wherein the data packet comprises the IP address of the destination host and the MAC address of the destination host;

determine the another NVE device according to the MAC address of the destination host, wherein the another NVE device stores a correspondence between the MAC address of the destination host and an IP address of a destination NVE device corresponding to the destination host;

obtain the IP address of the destination NVE device from the another NVE device according to the MAC address of the destination host or the IP address of the destination host;

encapsulate the data packet to produce an encapsulated data packet, wherein the encapsulated data packet comprises the IP address of the destination NVE device corresponding to the destination host; and send the encapsulated data packet to the destination NVE device.

15. The NVE device according to claim 14, wherein when the another NVE device is determined according to the IP address of the destination host, the processor is configured to execute the program code further to determine the another NVE device according to the IP address of the destination host or the MAC address of the destination host, using a distributed hash table search algorithm.

16. The NVE device according to claim 14, wherein the processor is configured to execute the program code further to send a response packet of the address resolution request packet to the source host, wherein the response packet of the address resolution request packet comprises the MAC address of the destination host.

17. The NVE device according to claim 14, wherein the processor is configured to execute the program code further to send an address resolution request announcement packet to all hosts managed by the NVE device, wherein the address resolution request announcement packet comprises the MAC address of the destination host.

18. The NVE device according to claim 14, wherein the source host and destination host are located in a virtual network, wherein the NVE device is located at a boundary between the virtual network and a physical network, and wherein encapsulating the data packet comprises tunnel encapsulating the data packet.

* * * * *